UNITED STATES PATENT OFFICE.

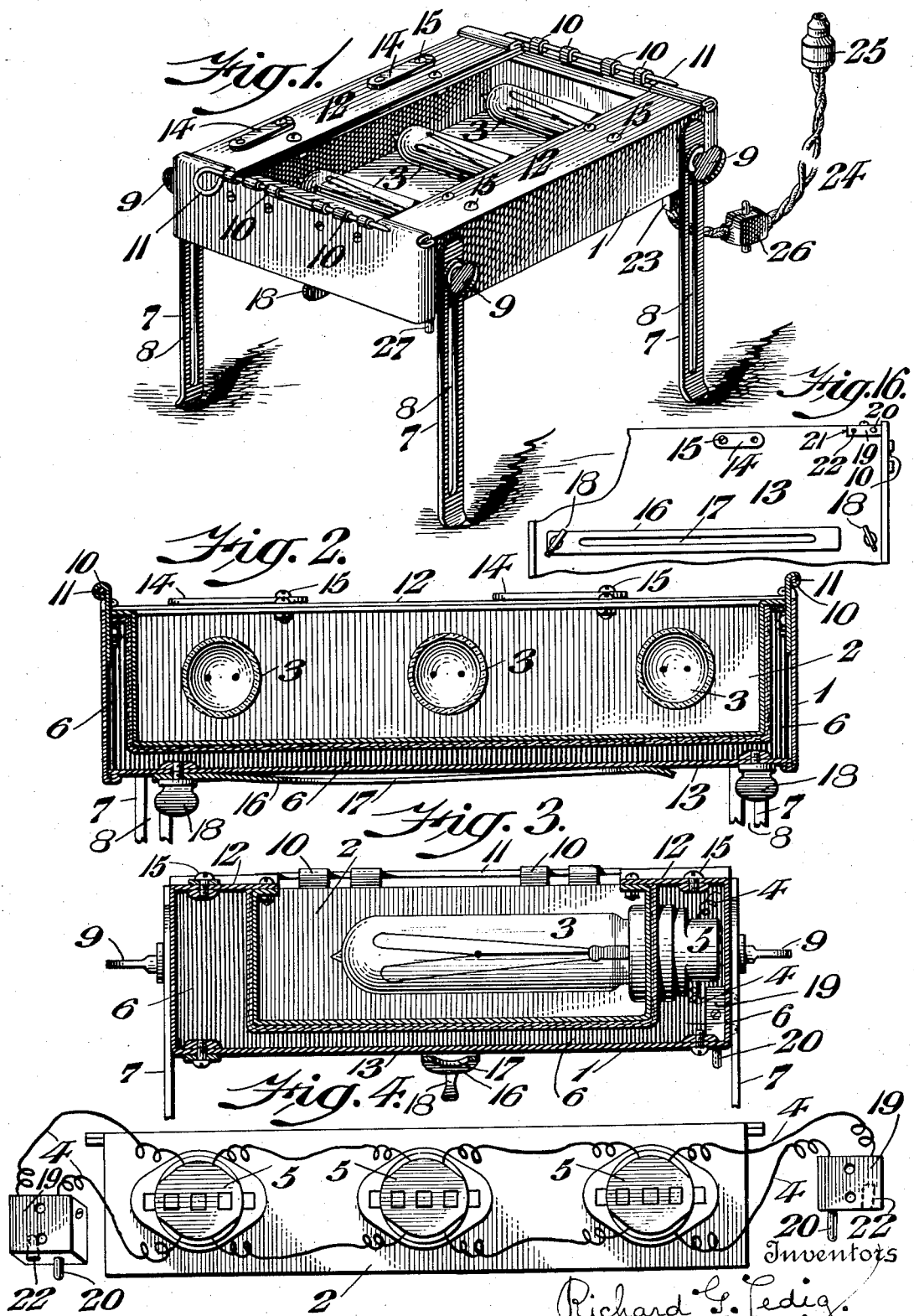

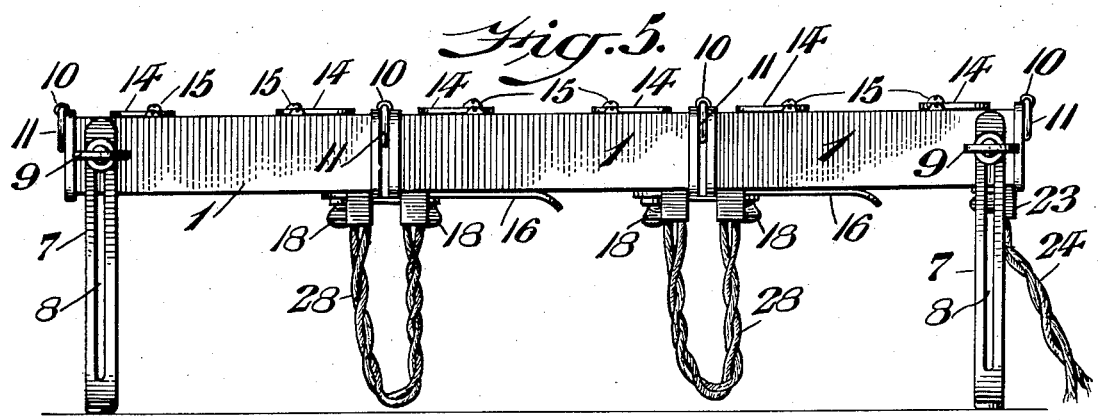
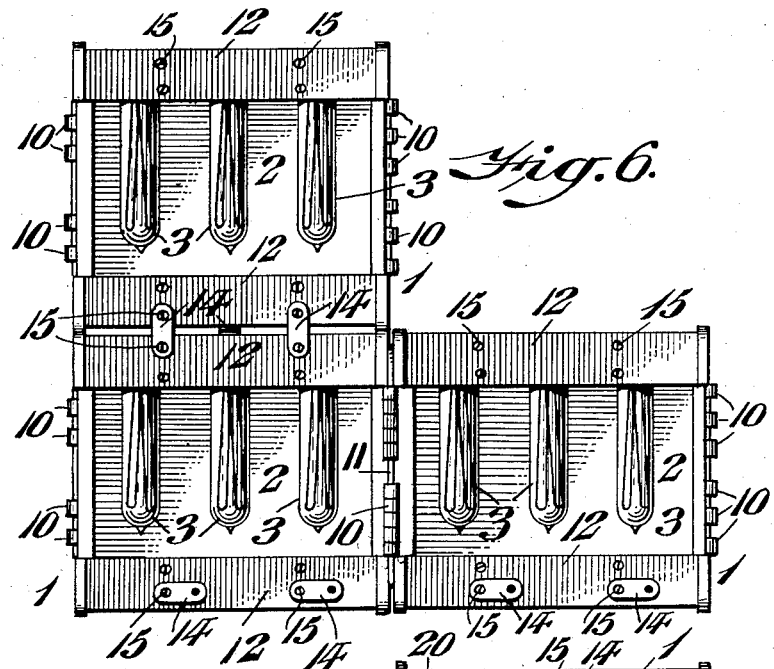
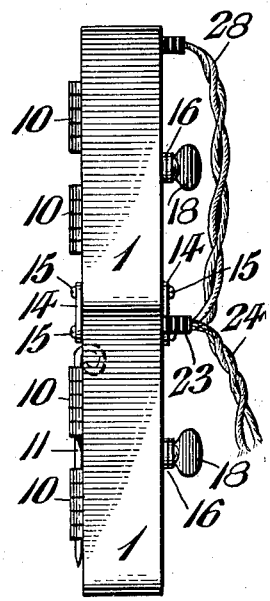
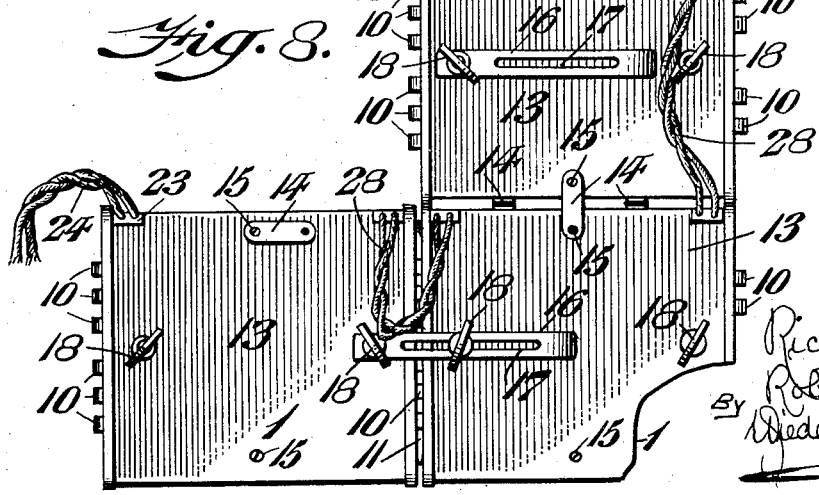

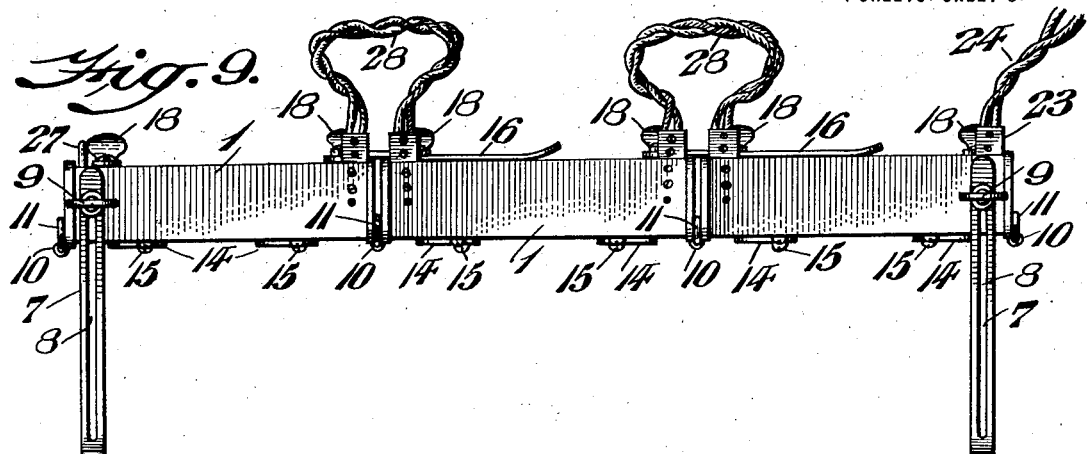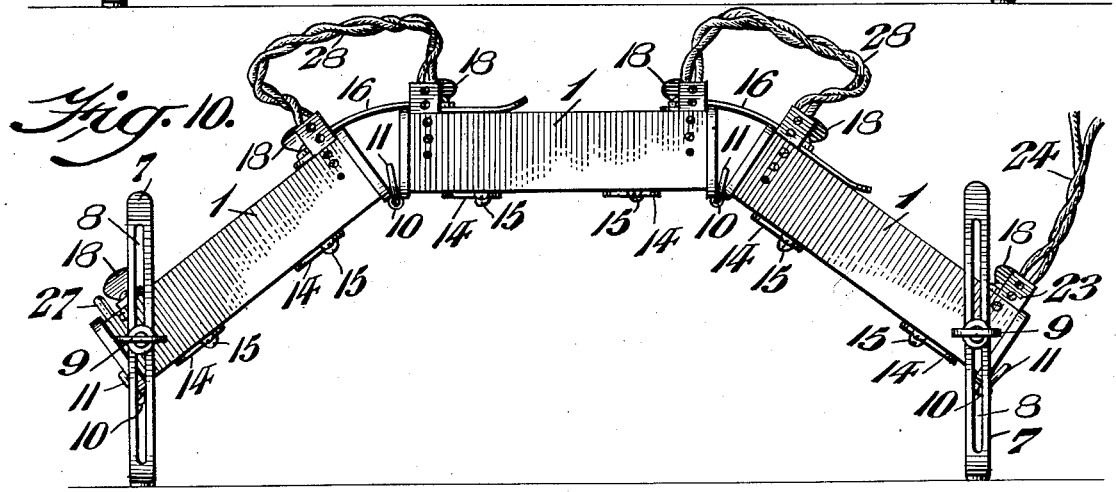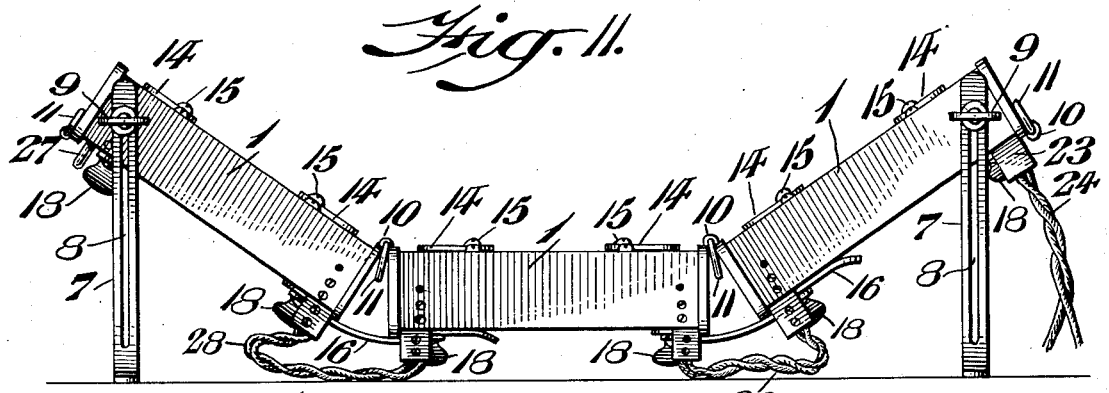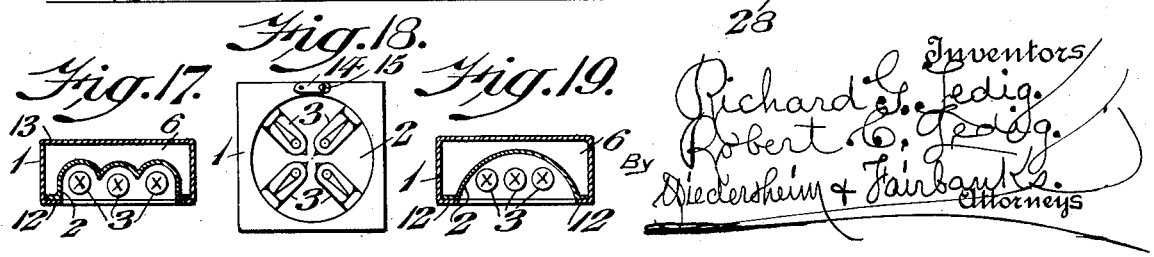

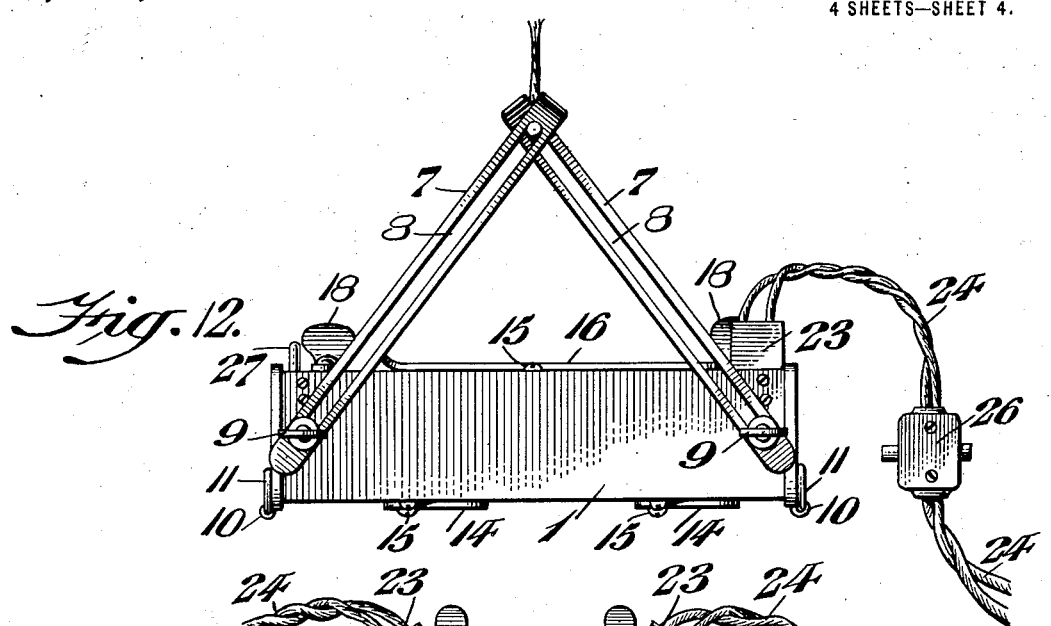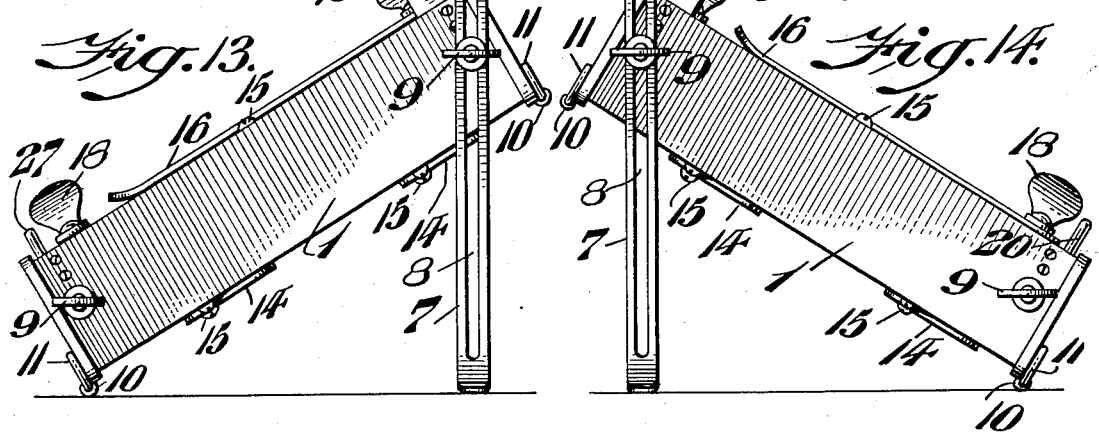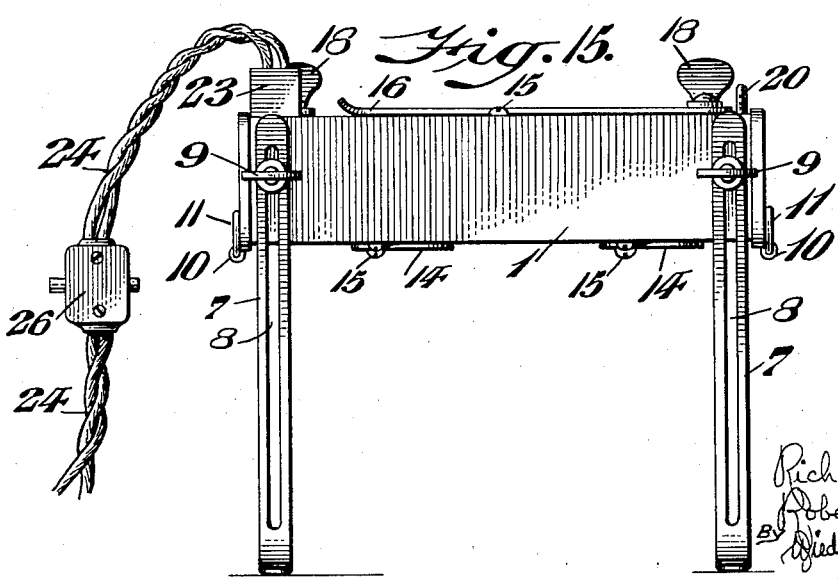

RICHARD G. LEDIG AND ROBERT C. LEDIG, OF PHILADELPHIA, PENNSYLVANIA, ASSIGNORS TO A. MECKY COMPANY, OF PHILADELPHIA, PENNSYLVANIA, A CORPORATION OF PENNSYLVANIA.

ELECTRO HEATING AND LIGHTING APPARATUS.

1,288,932.  Specification of Letters Patent.  Patented Dec. 24, 1918.

Application filed January 18, 1918. Serial No. 212,417.

*To all whom it may concern:*

Be it known that we, RICHARD G. LEDIG and ROBERT C. LEDIG, both citizens of the United States, residing in the city and county of Philadelphia, State of Pennsylvania, have invented a new and useful Electro Heating and Lighting Apparatus, of which the following is a specification.

Our invention relates to an electro heating and lighting device, the same consisting of a casing which is provided with appurtenances whereby it may be coupled with another casing or a number of casings equipped with electric lamps, so as to produce combinations of casings which may be placed in various positions relative to requirements of use.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of an electro heating and lighting apparatus embodying our invention.

Fig. 2 represents a longitudinal section thereof on an enlarged scale.

Fig. 3 represents a transverse section thereof on an enlarged scale.

Fig. 4 represents a side elevation of the portion of the apparatus showing means for energizing a number of electric lamps employed.

Figs. 5, 6, 7, 8, 9, 10 and 11 represent side elevations of different combinations that may be produced by pluralities of the apparatus.

Fig. 12 represents a side elevation of the apparatus in depending condition.

Figs. 13 and 14 represent side elevations of the apparatus in positions inclined respectively to the left and right.

Fig. 15 represents a side elevation of the apparatus, the casing of which is reversed from that shown in Fig. 1.

Fig. 16 represents a bottom plan view of the casing shown in Fig. 1.

Figs. 17 and 19 represent sections of other forms of the apparatus on a reduced scale.

Fig. 18 represents a front elevation of another form of the apparatus on a reduced scale.

Similar numerals of reference indicate corresponding parts in the figures.

Referring to the drawings.

1 designates a casing formed of suitable metal or other material closed on its sides, ends and bottom, and open at what may be termed its front.

Within said casing is the heating and lighting chamber 2 formed of metal or other suitable material preferably copper, said chamber containing the electric lamps 3 which are sustained on one of the walls of said chamber and being in an electric circuit by the conductors 4 which are connected properly with the sockets 5 which sustain the lamps, contact points being employed on said sockets and the lamps to energize the latter, as well known in electric lamps. The chamber 2 is provided with a reflecting surface and is closed on its sides and bottom, and open at what may be termed its front to accord with the open front of the casing 1, so as to adapt the resultant heat and light of the lamps to be deflected outwardly to a place of service.

The walls of the chamber 2 are separated from the walls of the casing 1 forming the space 6 comprising an air chamber whereby the exterior casing is kept in comparatively cool condition, and so not liable to burn the hands of anyone touching the same. It will be noticed the sockets of the lamps are fitted in the side air space between the casing and lamp chamber, in which space said sockets are most convenient of access for the connection of the wires that extend on the exterior casing from the places of attachment of the electric conductors, while the bodies of the lamp are in the chamber 2 where they may be readily screwed to and unscrewed from the sockets in the air spaces, as most plainly shown in Fig. 3.

As shown in Figs. 1, 2, and 3, the outer walls 12 of the casing 1 are inturned from the exterior of the casing to the walls of the lamp chamber so as to close the air spaces 6 at what may be termed the outer portions of the latter, and form the means for supporting the pivotal plates 14, on one side of the casing while the opposite wall has therein openings for screws 15 for the attachment of similar additional plates 14 whereby adjacent casings may be coupled and placed in various combinations of positions.

Then the back or underside of the casing has thereon the foldable straps 16 of pliable material which may be connected with an adjacent electrically equipped casing or adjacent casings for forming combinations of casings, as will be hereinafter further described.

7 designates legs which are adapted to sustain the casing with its contents, as in Fig. 1, said legs having thereon longitudinally-extending slots 8 through which pass the shanks of the thumb screws 9, said shanks entering the sides of the casing 1, adapting said legs to be held in upright position, as in said Fig. 1, and adapting the casing to be adjusted in height or placed in various positions as shown in other figures to be hereinafter stated.

On the sides of the casing 1 preferably at the front thereof are the knuckles 10 through which are adapted to be passed the pintles 11 whereby two or more casings with their appurtenances may be coupled together, the knuckles of opposite casings having the pintles passed therethrough, thus connecting the casings hinge-like.

Pivotally connected with the front wall 12 of the casing, and the under or back wall 13 are the plates 14 of metal, or other rigid material, the connecting screws 15 employed being passed through said plates into the respective walls, the screws being duplicated on opposite sides of said walls, whereby two or more casings may be placed together in various forms and connected by said plates, producing combinations, forms of which are shown in Figs. 6, 7 and 8.

The plates 14 when not required for service are folded on the outer wall of the casing, as in Fig. 1, and other figures, and may be turned for coupling purposes with other casings as shown in Figs. 6 and 8.

On the back of the casing are the straps 16 of pliable material and having therein the longitudinally-extending slots 17 through which are passed the shanks of thumb screws 18, by which provision the straps may be shifted to various positions and held thereat for coupling two or more casings, said straps being bendable admitting certain of the casings to be placed at an angle to another casing in forming combinations of the apparatus, two of which are shown in Figs. 10 and 11.

Within the casing 1 is the plug 19 with which the conductors 4 are connected, said plug being provided with the pin 20, the latter projecting outwardly from said casing through the recesses 21 in the back or rear wall of said casing, said plug having therein an opening as a socket 22 to receive a pin on the plug 23 of the primary electric conductor 24, the latter being provided with the screw plug 25 for attachment to an electric fixture and the switch 26, for evident purposes, see Fig. 1.

The casing has also thereon an additional pin 27 in electrical contact with an adjacent lamp in the casing so that electrical conductors 28 may be connected with adjacent casings to energize the lamps thereof—forms of which are shown in Figs. 5, 7, 8, 9, 10 and 11.

It will be seen that the casing 1 may be supported in upright position, as shown in Figs. 1, 2, and 3, and held at a desired height by means of the legs 7 which admit of the adjustment of the height of said casing. Here the heat from the lamps in the chamber 2 may be transmitted upwardly. The casing may be inverted as shown in Fig. 15, so as to transmit the heat downward.

A number of casings may be coupled by the knuckles 10 and pintles 11 in horizontal position, as in Fig. 5, so as to correspondingly lengthen the apparatus in horizontal direction, said sections being electrically connected by the conductors 28.

A number of casings may be coupled by the knuckles 10, and a pintle 11, and a strap 16, and another casing may be placed above one of the same, as in Figs. 6, 7 and 8, and connected therewith by plates 14 so as to prevent overturning of the latter named casing forming an L-shaped form of the apparatus, the casings being electrically connected.

A number of casings may be coupled and electrically connected in a position inverted from that shown in Fig. 1, to that shown in Fig. 9.

A number of casings may be coupled and electrically connected with the end sections thereof placed in reversed inclined directions, as shown in Figs. 10 and 11, those in Fig. 11 being in inverted positions to that in Fig. 10.

The legs may be employed as hangers as in Fig. 12, so as to sustain a casing in suspended or depending position.

A casing may be inclined to the left as in Fig. 13, and it may be inclined to the right as in Fig. 14, it being evident also that various positions of a casing and various combinations of casings may be accomplished by the device employed.

It is to be noticed that the primary electric conductor connectible with the casing is adapted to energize the lamps as has been stated, and that when combinations of casings similarly equipped are to be made, forms of which are shown in Figs. 5 to 11 inclusive, an auxiliary conductor is connected with one casing, presented to an adjacent casing and connected therewith, as said Figs. 5 to 11 inclusive so clearly indicate.

When a combination is to be broken up the auxiliary conductors of adjacent casings are disconnected, the plates 14, and straps 16 are manipulated to be released from connecting adjacent casings and the legs are removed or folded from the latter and applied to the primary casing, it being seen that the form shown in Fig. 1 is that of the primary casing as a unitary device, and all other casings with their appurtenances are each unitary devices requiring however the auxiliary electric conductors to be applied and secured to adjacent casings as required in building up combinations referred to.

It is evident that the heat may be used for therapeutic purposes of baking an afflicted part of a human body by subjecting said part to said heat, but the light radiated may be beneficial in the treatment whether for hospital, physicians', or personal use.

Again, the apparatus is serviceable for light alone or for heat alone, and it may be employed for drying fruit and other material and objects, heating and warming food and other purposes generally, and so to its use we do not limit ourselves.

Having thus described our invention what we claim as new and desire to secure by Letters Patent, is:

A casing, a leg, the latter having therein a longitudinally-extending slot, a screw adapted to pass through said slot in said casing pivotally adjustably connecting said leg with said casing, a hinge-like member on said casing, and a strap of pliable material, the latter having therein a longitudinally-extending slot, and an additional screw in said strap adapted to enter an adjacent casing, said strap being adapted to flexibly retain adjacent casings in various angular positions relatively to each other.

RICHARD G. LEDIG.
ROBERT C. LEDIG.

Witnesses:
 JOHN A. WIEDERSHEIM,
 N. BUSSINGER.